US012547688B2

(12) United States Patent
Kim et al.

(10) Patent No.: US 12,547,688 B2
(45) Date of Patent: Feb. 10, 2026

(54) FACE AUTHENTICATION SYSTEM, VEHICLE INCLUDING THE SAME, AND FACE AUTHENTICATION METHOD

(71) Applicants: Hyundai Motor Company, Seoul (KR); Kia Corporation, Seoul (KR)

(72) Inventors: Hyunsang Kim, Gyeonggi-do (KR); Yun Sup Ann, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 337 days.

(21) Appl. No.: 17/862,955

(22) Filed: Jul. 12, 2022

(65) Prior Publication Data

US 2023/0126806 A1    Apr. 27, 2023

(30) Foreign Application Priority Data

Oct. 27, 2021    (KR) .......................... 10-2021-0145030

(51) Int. Cl.
  *G06F 21/32*        (2013.01)
  *G06V 10/74*        (2022.01)
  (Continued)

(52) U.S. Cl.
  CPC ............ *G06F 21/32* (2013.01); *G06V 10/761* (2022.01); *G06V 20/56* (2022.01); *G06V 40/161* (2022.01);
  (Continued)

(58) Field of Classification Search
  CPC ....... G06F 21/32; G06F 21/45; G06V 10/761; G06V 20/56; G06V 40/161; G06V 40/172;
  (Continued)

(56) References Cited

U.S. PATENT DOCUMENTS 11,315,341 B2 *  4/2022  Aoki .................. G06V 40/1371
11,929,997 B2 *  3/2024  Briceno ................ H04W 12/06
(Continued)

FOREIGN PATENT DOCUMENTS

JP    2006-031282 A    2/2006
JP    2007-199840 A    8/2007
(Continued)

OTHER PUBLICATIONS

Office Action dated Sep. 14, 2025 for Korean Patent Application No. 10-2021-0145030, 8 pages.

*Primary Examiner* — Huan V Doan
(74) *Attorney, Agent, or Firm* — Fox Rothschild LLP

(57) ABSTRACT

A face authentication system capable of flexibly coping with a change in a user's appearance and surrounding environment includes: a camera configured to acquire a first image for performing a face authentication process; and a controller configured to compare the first image with the at least one reference face image based on the face authentication process being started, determine a similarity score based on the first image being compared with the at least one reference face image, determine that face authentication may be successful in response to the similarity score being greater than a first threshold value, and register the first image as the at least one reference face image in response to the similarity score being greater than the first threshold value and less than a second threshold value.

15 Claims, 12 Drawing Sheets

(51) Int. Cl.
 *G06V 20/56* (2022.01)
 *G06V 40/16* (2022.01)
 *G06V 40/50* (2022.01)
 *B60R 25/25* (2013.01)
 *B60R 25/30* (2013.01)

(52) U.S. Cl.
 CPC ............ *G06V 40/172* (2022.01); *G06V 40/50* (2022.01); *B60R 25/25* (2013.01); *B60R 25/305* (2013.01)

(58) Field of Classification Search
 CPC ...... G06V 40/50; G06V 40/168; B60R 25/25; B60R 25/305; B60K 35/00; B60K 35/22; G06T 7/0014
 See application file for complete search history.

(56) References Cited

U.S. PATENT DOCUMENTS

| | | | |
|---|---|---|---|
| 2014/0059311 A1* | 2/2014 | Oberhofer | G06F 3/065 |
| | | | 711/162 |
| 2016/0350826 A1* | 12/2016 | Glasgow | G06Q 30/0619 |
| 2017/0140212 A1* | 5/2017 | Lo | G06V 40/171 |
| 2017/0220270 A1* | 8/2017 | James | G06F 3/0649 |
| 2019/0253404 A1 | 8/2019 | Briceno et al. | |
| 2019/0303551 A1 | 10/2019 | Tussy | |
| 2020/0082062 A1* | 3/2020 | Mequanint | G06F 21/44 |
| 2020/0151433 A1 | 5/2020 | Kim et al. | |
| 2021/0009080 A1 | 1/2021 | Hu et al. | |
| 2021/0061224 A1 | 3/2021 | Kim et al. | |
| 2021/0291790 A1* | 9/2021 | Morosawa | G06V 40/173 |
| 2023/0394127 A1* | 12/2023 | Tussy | H04L 63/123 |

FOREIGN PATENT DOCUMENTS

| | | |
|---|---|---|
| KR | 10-2016-0063870 A | 6/2016 |
| KR | 10-1886416 B1 | 9/2018 |

\* cited by examiner

FACE AUTHENTICATION SYSTEM, VEHICLE INCLUDING THE SAME, AND FACE AUTHENTICATION METHOD

CROSS-REFERENCE TO RELATED APPLICATION

This application is based on and claims priority under 35 U.S.C. § 119 to Korean Patent Application No. 10-2021-0145030, filed on Oct. 27, 2021 in the Korean Intellectual Property Office, the disclosure of which is incorporated herein by reference.

BACKGROUND

1. Field

The present disclosure relates to a face authentication system, a vehicle including the face authentication system, and a face authentication method, and more specifically, to a face authentication system robust to a change in a user's appearance and environment, a vehicle including the face authentication system, and a face authentication method.

2. Description of the Related Art

Face authentication technology, which may be one of biometric authentication technologies, may be an authentication technology of determining whether a user may be a valid user based on a face displayed in a still image or moving image.

Recently, with the convenience and efficiency of the face authentication technology, the face authentication technology has been widely used in various application fields, such as a security system, a mobile authentication system, and a vehicle access and ignition system.

However, since the conventional face authentication technology may not flexibly cope with a change in a user's appearance and surrounding environment, authentication failure frequently occurs even when the genuine user performs face authentication.

SUMMARY

It may be an object of the disclosure to provide a face authentication system capable of flexibly coping with a change in a user's appearance and surrounding environment, a vehicle including the same, and a face authentication method.

The technical objectives of the disclosure may not be limited to the above, and other objectives may become apparent to those of ordinary skill in the art based on the following descriptions.

According to an exemplary embodiment of the disclosure, there may be provided a face authentication system including: a camera configured to acquire a first image for performing a face authentication process; a storage configured to store and having stored thereon at least one reference face image; and a controller configured to compare the first image with the at least one reference face image based on the face authentication process being started, determine a similarity score based on the first image being compared with the at least one reference face image, determine that face authentication is successful in response to the similarity score being greater than a first threshold value, and register the first image in the storage as the at least one reference face image in response to the similarity score being greater than the first threshold value and less than a second threshold value.

The face authentication system may further include a display, wherein the controller may be configured to, determine that face authentication fails in response to the similarity score being less than the first threshold value, and based on a user authentication being success by another authentication device while the similarity score may be less than the first threshold value and greater than a third threshold value, control the display to output a visual indication for inquiring a presence of an intention to register the first image as the at least one reference face image.

The controller may be configured to, based on receiving a user input representing the intention to register the first image as the at least one reference face image while the similarity score may be less than the first threshold value and greater than the third threshold value, register the first image as the at least one reference face image.

The at least one reference face image may include a plurality of reference face images, and the controller may be configured to: determine a plurality of similarity scores based on comparison of the first image with each of the plurality of reference face images; in response to at least one similarity score among the plurality of similarity scores being greater than the first threshold value, determine that the face authentication is successful, and in response to the at least one similarity score being greater than the first threshold value and all of the plurality of similarity scores being less than the second threshold value, register the first image as the at least one reference face image.

The controller may be configured to: determine a plurality of similarity scores based on comparison of the first image with each of the plurality of reference face images; and in response to an average value of the plurality of similarity scores being greater than the first threshold value, determine that the face authentication is successful.

The controller may be configured to: determine at least one of an acquisition condition of the first image or an appearance condition of a user included in the first image based on the first image; determine weights for each of the plurality of similarity scores based on the at least one of the acquisition condition of the first image or the appearance condition of the user; and determine the average value of the plurality of similarity scores by reflecting the weights for each of the plurality of similarity scores.

The controller may be configured to: receive information about an exposure value for acquiring the first image from the camera; and determine whether the first image is acquired outdoors or indoors based on the information about the exposure value.

The controller may be configured to, upon determining that the first image may be acquired outdoors, register the first image in a first storage space of the storage, and upon determining that the first image may be acquired indoors, register the first image in a second storage space of the storage.

The controller may be configured to: in response to the first storage space being full, delete a first reference face image from among a plurality of first reference face images stored in the first storage space to register the first image in the first storage space; and in response to the second storage space being full, delete a second reference face image from among a plurality of second reference face images stored in the second storage space to register the first image in the second storage space.

The controller may be configured to: determine a first reference face image targeted for deletion from among the plurality of first reference face images based on at least one of a storage time of a respective one of the plurality of first reference face images or a cumulative average value of a similarity score calculated using a respective one of the plurality of first reference face images; and determine a second reference face image targeted for deletion from among the plurality of second reference face images based on at least one of a storage time of a respective one of the plurality of second reference face images or a cumulative average value of a similarity score calculated using a respective one of the plurality of second reference face images.

The controller may be configured to: determine a first reference face image having the storage time stored the earliest in time, having a cumulative average value of the similarity score that may be the lowest, or having a sum of a first value corresponding to the storage time and a second value corresponding to the cumulative average value of the similarity score that may be the smallest among the plurality of first reference face images, as the first reference face image targeted for deletion, and determine a second reference face image having the storage time stored the earliest in time, having a cumulative average value of the similarity score that may be the lowest, or having a sum of a first value corresponding to the storage time and a second value corresponding to the cumulative average value of the similarity score that may be the smallest among the plurality of second reference face images, as the second reference face image targeted for deletion.

A maximum number of images to be stored in the first storage space may be different from a maximum number of images to be stored in the second storage space.

The controller may be configured to register the first image as the at least one reference face image in the storage only when eyes, a nose, and a mouth may be detected from a face in the first image.

According to another exemplary embodiment of the disclosure, there may be provided a face authentication method including: acquiring a first image for performing a face authentication process; comparing the first image with at least one reference face image based on the face authentication process being started; determining a similarity score based on the first image being compared with the at least one reference face image; determining that face authentication may be successful in response to the similarity score being greater than a first threshold value; and registering the first image as the at least one reference face image in response to the similarity score being greater than the first threshold value and less than a second threshold value.

The face authentication method may further include: determining that face authentication fails in response to the similarity score being less than the first threshold value, and based on a user authentication being success by another authentication device while the similarity score may be less than the first threshold value and greater than a third threshold value, outputting a visual indication for inquiring a presence of an intention to register the first image as the at least one reference face image.

The face authentication method may further include, based on receiving a user input representing the intention to register the first image as the at least one reference face image while the similarity score may be less than the first threshold value and greater than the third threshold value, registering the first image as the at least one reference face image.

The at least one reference face image may include a plurality of reference face images, the determining of the similarity score may include determining a plurality of similarity scores based on comparison of the first image with each of the plurality of reference face images, the determining that the face authentication may be successful may include, in response to at least one similarity score among the plurality of similarity scores being greater than the first threshold value, and the registering of the first image as the least one reference face image may include, in response to the at least one similarity score being greater than the first threshold value and all of the plurality of similarity scores being less than the second threshold value, registering the first image as the at least one reference face image.

The determining of the similarity score may include determining a plurality of similarity scores based on comparison of the first image with each of the plurality of reference face images, and the determining that the face authentication may be successful may include, in response to an average value of the plurality of similarity scores being greater than the first threshold value, determining that the face authentication may be successful.

The determining that the face authentication may be successful in response to the average value of the plurality of similarity scores being greater than the first threshold value may include: determining at least one of an acquisition condition of the first image or an appearance condition of a user included in the first image based on the first image being processed, determining weights for each of the plurality of similarity scores based on the at least one of the acquisition condition of the first image or the appearance condition of the user, and determining the average value of the plurality of similarity scores by reflecting the weights for each of the plurality of similarity scores.

The face authentication method may further include: receiving information about an exposure value from a camera from which the first image may be acquired; and determining whether the first image is acquired outdoors or indoors based on the information about the exposure value.

The registering of the first image as the least one reference face image may include: upon determining that the first image may be acquired outdoors, registering the first image in a first storage space; and upon determining that the first image may be acquired indoors, registering the first image in a second storage space.

The registering of the first image in the first storage space may include, in response to the first storage space being full, deleting a first reference face image from among a plurality of first reference face images stored in the first storage space to register the first image in the first storage space, and the registering of the first image in the second storage space may include, in response to the second storage space being full, deleting a second reference face image from among a plurality of second reference face images stored in the second storage space to register the first image in the second storage space.

The deleting of the first reference face image from among the plurality of first reference face images stored in the first storage space may include determining a first reference face image targeted for the deletion from among the plurality of first reference face images based on at least one of: a storage time of a respective one of the plurality of first reference face images; or a cumulative average value of a similarity score calculated using a respective one of the plurality of first reference face images, and The deleting of the second reference face image from among the plurality of second reference face images stored in the second storage space may include determining a second reference face image targeted for the deletion from among the plurality of second reference face images based on at least one of a storage time of a respective one of the plurality of second reference face images or a cumulative average value of a similarity score calculated using a respective one of the plurality of second reference face images.

The registering of the first image as the at least one reference face image may include registering the first image as the at least one reference face image in the storage only when eyes, a nose, and a mouth may be detected from a face of the user recognized based on the first image being processed.

According to an exemplary embodiment of the disclosure, there may be provided a vehicle including the face authentication system as described herein.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
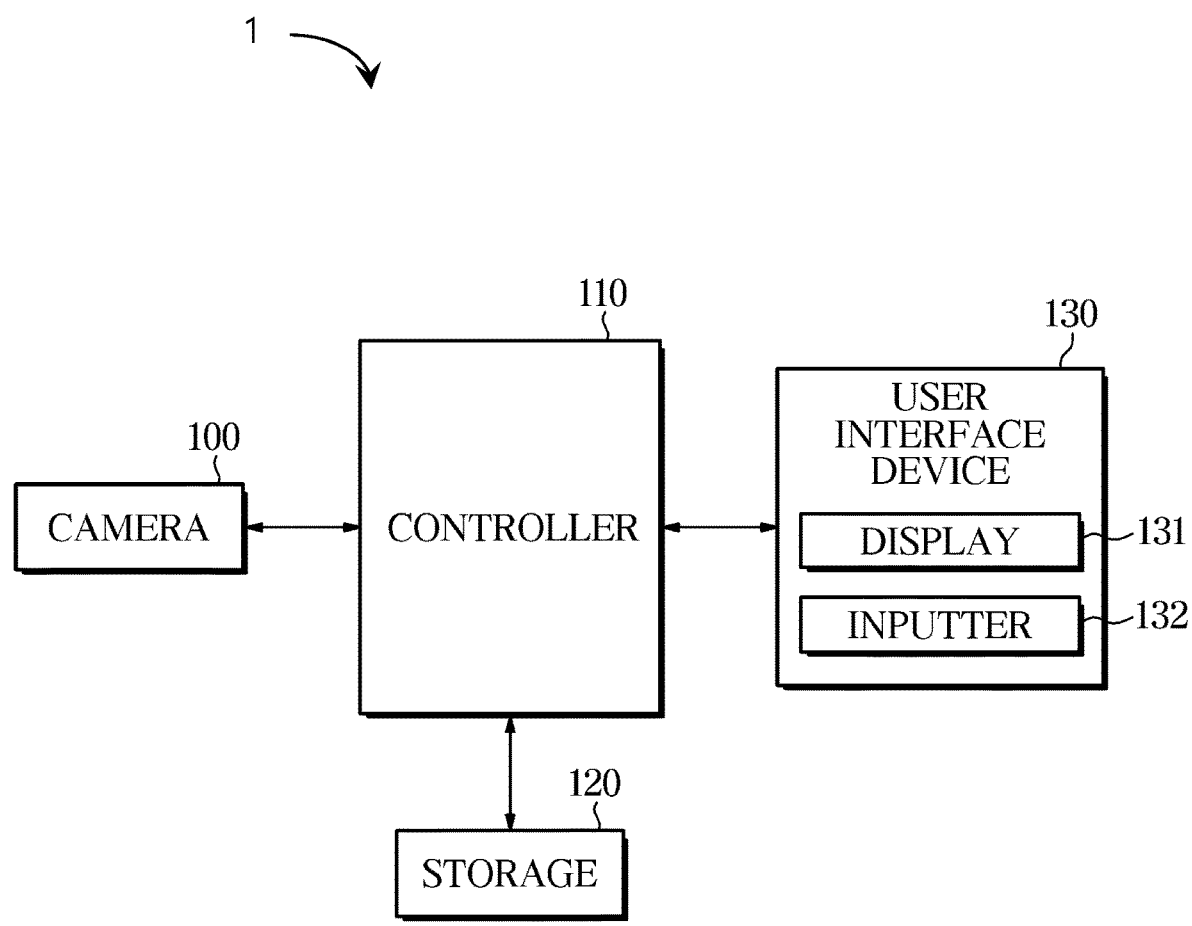
FIG. 1 is a block diagram illustrating a configuration of a face authentication system according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. Fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, rom, ram, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a controller area network (can).

Unless specifically stated or obvious from context, as used herein, the term "about" is understood as within a range of normal tolerance in the art, for example within 2 standard deviations of the mean. "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Advantages and features of embodiments, and methods of achieving the same will be clearly understood with reference to the accompanying drawings and the following detailed embodiments. However, the present inventive concept may not be limited to embodiments described herein, but may be implemented in various different forms. Embodiments may be provided in order to explain the present inventive concept for those skilled in the art. The scope of the present inventive concept is defined by the appended claims.

The terms used herein will be briefly described and embodiments will be described in detail.

Although the terms used herein may be selected from among general terms that may be currently and widely used in consideration of functions in embodiments, these may be changed according to intentions or customs of those skilled in the art or the advent of new technology. In addition, in a specific case, some terms may be arbitrary selected by applicants. In this case, meanings thereof will be described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like may not be limited to software or hardware. "Part," "module," "unit," and the like may be configured in a recording medium that may be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Hereinafter, with reference to the accompanying drawings, embodiments of a face authentication system, a vehicle including the same, and a face authentication method will be described in detail so that a person skilled in the art may easily implement the disclosed disclosure. In addition, parts irrelevant to description may be omitted in the drawings in order to clearly explain exemplary embodiments. In the accompanying drawings, parts that may be identical or equivalent to each other will be assigned the same reference numerals, and in the following description of the embodiments, details of redundant descriptions thereof may be omitted.

FIG. 1 is a block diagram illustrating a configuration of a face authentication system according to an embodiment.

Referring to FIG. 1, a face authentication system 1 according to an embodiment may include a camera 100, a controller 110, a storage 120, and a user interface device 130.

The camera 100 may acquire a face image (hereinafter, a 'first image') of a user by photographing a face of the user.

The camera 100 may refer to any configuration capable of acquiring a face image of a driver. For example, the camera 100 may employ a complementary metal-oxide semiconductor (CMOS) image sensor or a charge-coupled device (CCD) image sensor.

The camera 100 may be installed at a location in which a face of a user may be easily photographed.

According to various embodiments, the camera 100 may be configured to automatically adjust the exposure value according to the amount of ambient light. The exposure value may include setting values for the shutter speed, aperture, and/or International Standard Organization (ISO) sensitivity. In an embodiment, the camera 100 may lower the exposure value as the surroundings may be bright and may increase the exposure value as the surroundings may be dark.

For example, the camera 100 may be configured to set the exposure value to be less than or equal to a preset value in an outdoor space with sunlight, and may be configured to set the exposure value to be greater than the preset value in an indoor space darker than an outdoor space.

The camera 100 may operate based on a control signal of the controller 110, and may transmit the first image to the controller 110.

The controller 110 may perform various functions based on the first image received from the camera 100.

For example, the controller 110 may perform a face authentication process based on the first image received from the camera 100. In addition, the controller 110 may be configured to move a lens of the camera 100 or rotate the camera 100 based on the first image to adjust a field of view of the camera 100.

The controller 110 may include at least one memory in which a program for performing the above-described operations and operations to be described below may be stored, and at least one processor for executing the stored operations in the form of one or more programs. The controller 110 may be electrically connected to the camera 100, the storage 120, the user interface device 130 and/or various components of a device equipped with the face authentication system 1, to control the camera 100, the storage 120, the user interface device 130, and/or the various components of a device equipped with the face authentication system.

When the controller 110 includes a plurality of memories and a plurality of processors, the plurality of memories and the plurality of processors may be integrated into one chip or may be physically separated. In addition, the controller 110 may include an image processor for processing an image obtained from the camera 100.

For example, the controller 110 may be configured to perform a face authentication process of authenticating the user by comparing the first image with a reference face image stored in the storage 120.

In an embodiment, the controller 110 may be configured to perform image pre-processing on the first image. The image preprocessing process may include one or more processes of processing the first image to have a form more suitable for face authentication. For example, the image preprocessing process may include a process of removing noise included in the first image, a process of increasing the contrast of the first image, a deblurring process of removing blur included in the first image, a process of removing a background region, a warping process of correcting distortion included in the first image, a process of binarizing the first image, or any combination thereof.

The controller 110 may be configured to detect a face region in the first image. The controller 110 may detect the face region in the first image using, for example, a Haar-based cascade AdaBoost classifier, a neural network-based classifier, or a support vector machine. However, the scope of the present disclosure may not be limited thereto, and the controller 110 may detect a face region from a first image using various face region detection techniques.

The controller 110 may be configured to normalize the detected face region. In an embodiment, the controller 110 may detect facial feature points (facial landmarks) in the detected facial region, and normalize the facial region based on the detected feature points. The controller 110 may detect facial landmarks in the face region, for example, using active contour model (ACM), active shape model (ASM), active appearance model (AAM), supervised descent method (SDM), a feature-point detection technique based on a neural network, or the like. The facial feature points may be feature points for major parts of a face, which may be provided to identify, for example, the eyebrows, eyes, nose, lips, chin, ears, or contours of a face. Normalization may include, for example, an image cropping process of extracting a face image representing a face region from the first image, a process of matching the positions of feature points detected in the face region to predefined reference positions, and a process of adjusting the size of the extracted face region. As an example, the face image extracted from the first image may have a form of a patch image. The controller 110 may be configured to match the positions of the feature points to the reference positions by performing affine transformation based on the detected positions of the feature points. Here, the affine transformation serves to map a vector space represented by the positions of the feature points to another vector space.

The controller 110 may be configured to compare facial feature points of the user extracted from the first image with feature points extracted from the reference face image, to compare the first image with the reference face image, and according to a result of the comparison, calculate a similarity score.

The similarity score may be a score that quantifies the similarity between the facial feature points of the user extracted from the first image and the feature points extracted from the reference face image, and may be calculated based on the similarity of the feature points.

The similarity score may increase as the difference between the feature values of the facial feature points of the user extracted from the first image and the feature values of the feature points extracted from the reference face image becomes smaller, and the similarity score may decrease as the difference becomes larger. The similarly score may therefore have a relative value that corresponds to the similarities or differences between the first image and the reference face image. Smaller/larger or increase/decrease are relative terms to the sliding scale of the similarities and differences made in the comparison and does not require or indicate an absolute quantitative value. A person of skill in the art reading the present disclosure can determine the relative values based on the purpose of the similarity score to assess the similarities between two images, and specifically the facial images contained within those two images.

The controller 110 may employ various algorithms to calculate the similarity score between the first image and the reference face image. For example, the controller 110 may execute an algorithm for comparing the feature values of the 'facial feature points of the user extracted from the first image with the feature values of the feature points extracted from the reference face image.

According to various embodiments, the controller 110 may calculate the similarity score between the first image and the reference face image using a learning model trained by machine learning.

The storage 120 may store various types of information required for performing the face authentication process. To this end, the storage 120 may be implemented as at least one memory.

The storage 120 may store thereon a reference face image serving as a reference for determining whether the user may be genuine.

Although the controller 110 and the storage 120 may be illustrated as being separately provided, the storage 120 may correspond to one of a plurality of memories of the controller 110.

The user may perform a face registration process to register a reference face image in the storage 120.

As an example, the controller 110 may be configured to control the user interface device 130 to output a user interface (e.g., a guide message) for performing a face registration process, and the user may perform a face registration process through the user interface device 130. The user may input a reference face image through the camera 100 according to a guide provided by the user interface device 130 to store the reference face image in the storage 120.

The storage 120 may be configured to receive and/or store at least one reference face image. For example, the storage 120 may store at least one reference face image for each of a plurality of users, and may store a plurality of reference face images for a single user.

When a plurality of users use the face authentication system 1, the controller 110 may specify a user based on the first image, and may perform a face authentication process based on a reference face image related to the specified user.

The user interface device 130 may include a display 131 for displaying various types of information related to the face authentication process and/or face registration process, and an inputter 132 for receiving various user inputs related to the face authentication process and/or face registration process.

The display 131 may include at least one display. The at least one display may be a Light Emitting Diode (LED) panel, an Organic Light Emitting Diode (OLED) panel, a Liquid Crystal Display (LCD) panel, and/or an indicator. In addition, the display 131 may include a touch screen.

The display 131 may output a visual indication indicating an authentication result of the face authentication process. For example, the face authentication system 1 may notify the user of a success or failure of the face authentication through illumination of the indicator.

The inputter 132 may include buttons, dials, and/or touchpads provided in various locations of a device (e.g., an electronic device or a vehicle) equipped with the face authentication system 1.

For example, the inputter 132 may include a push button, a touch button, a touch pad, a touch screen, a dial, a stick-type operation device, and/or a track ball. When the inputter 132 may be implemented as a touch screen, the inputter 132 may be provided integrally with the display 131.

The inputter 132 may receive a user input for performing a face registration process and/or a user input for confirming an intention of automatic face registration.

Although various components of the face authentication system 1 have been described above, a new configuration may be added or a described configuration may be omitted within the scope of the conventional technology.

For example, the face authentication system 1 may further include a communication module for receiving an image from an external device (e.g., a smart phone), and in this case, the controller 110 may perform the face authentication process based on the input image received from the external device.

Figure 2:
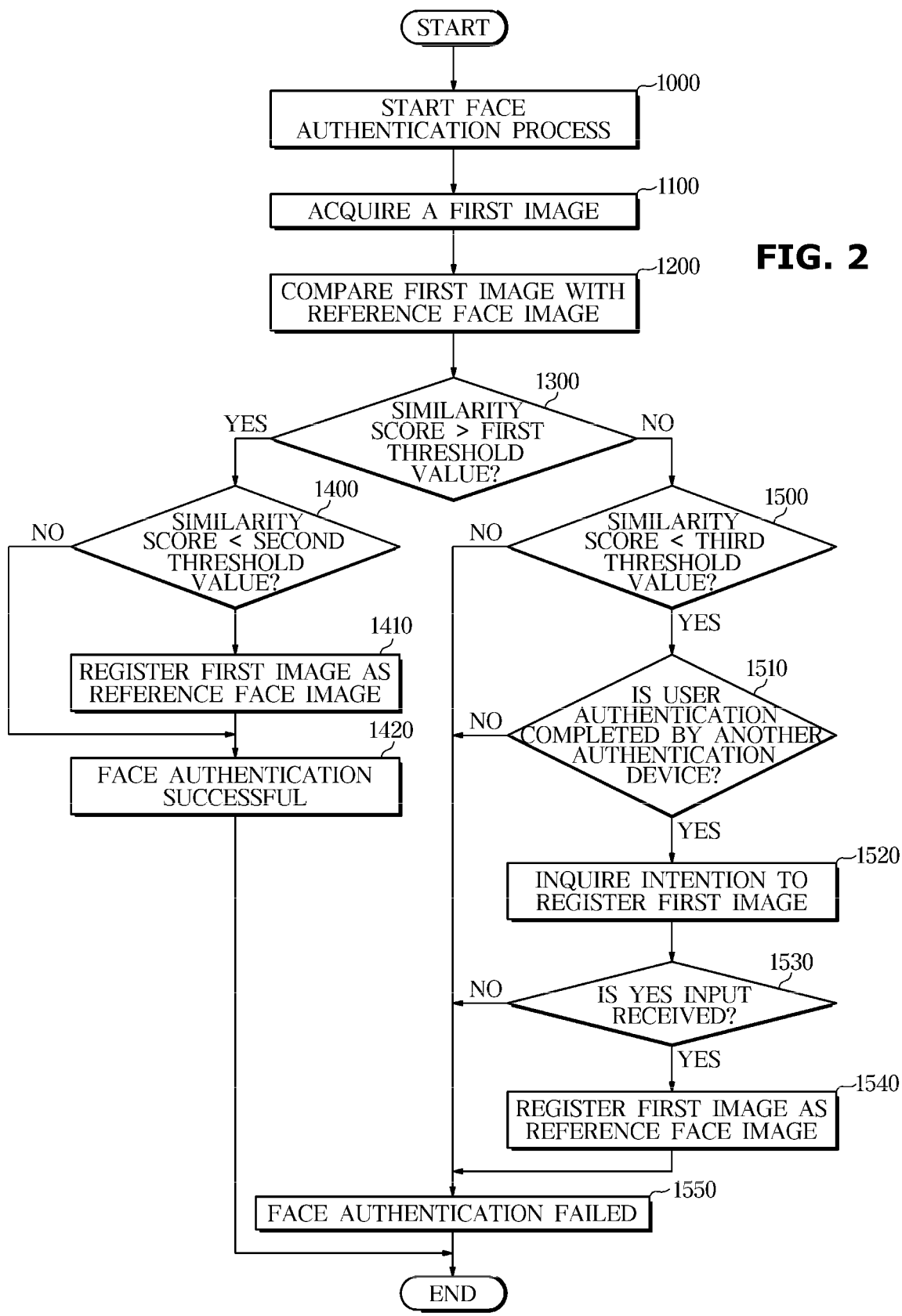
FIG. 2 is a flowchart showing a face authentication method using a face authentication system according to an exemplary embodiment of the disclosure.
Figure 3:
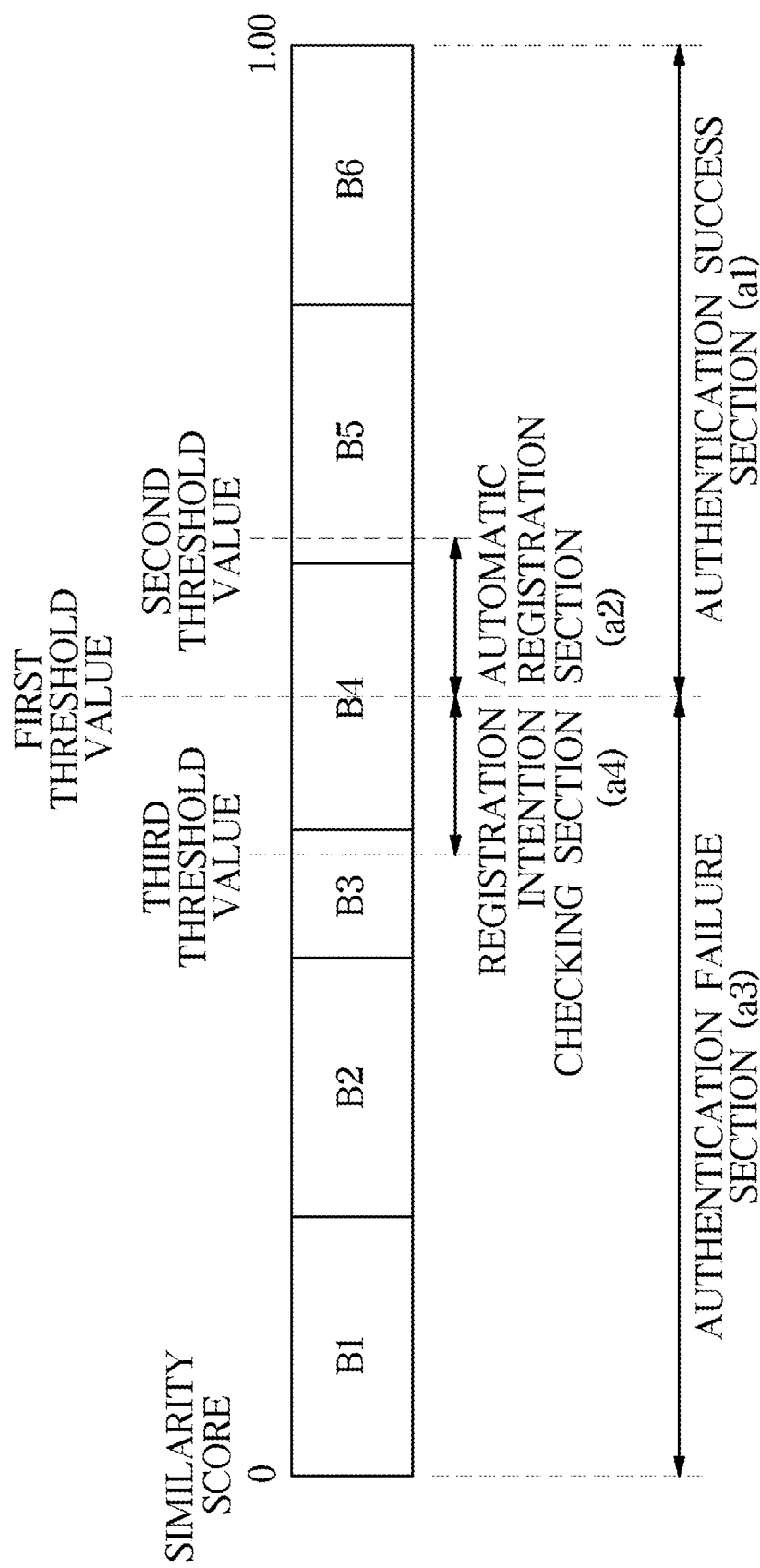
FIG. 3 is a diagram for describing a similarity score of a face authentication system according to an exemplary embodiment of the disclosure.
Figure 4:
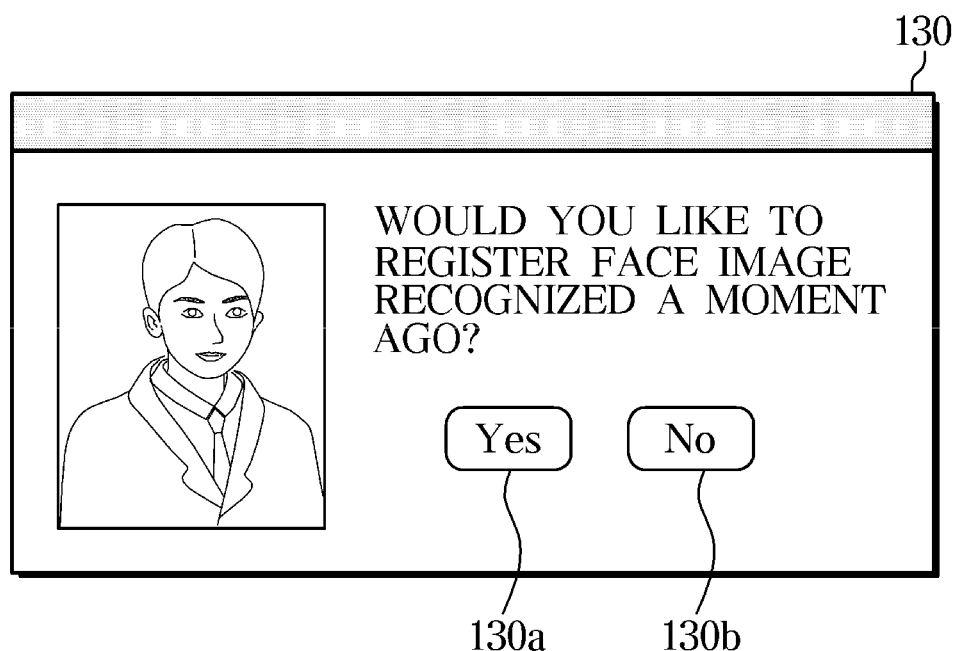
FIG. 4 is a diagram for describing an example in which a face authentication system inquires a user whether to register a face image according to an exemplary embodiment of the disclosure.

FIG. 2 is a flowchart showing a face authentication method using a face authentication system according to an embodiment. FIG. 3 is a diagram for describing a similarity score of a face authentication system according to an embodiment. FIG. 4 is a diagram for describing an example in which a face authentication system inquires a user to register a face image according to an embodiment.

Referring to FIG. 2, the controller 110 may start a face authentication process based on a preset condition being satisfied (1000).

As an example, in the case of the face authentication system 1 being mounted on a vehicle 3, the controller 110 may start a face authentication process based on a touch input received by a touch sensor provided on a door handle of the vehicle 3. As another example, the controller 110 may perform a face authentication process based on a proximity sensor of the vehicle 3 detecting an object around the vehicle 3.

In the case of the face authentication system 1 mounted on an electronic device 2 (e.g., a smart phone), the controller 110 may perform a face authentication process based on a display of the electronic device 2 being turned on. In addition, the controller 110 may start the face authentication process based on a face authentication request message being received from an application of the electronic device 2.

The controller 110 may be configured to, in response to a preset condition for starting the face authentication process being satisfied, control the camera 100 to acquire a first image.

In the exemplary embodiment, the camera 100 may operate only when the preset condition for starting the face authentication process is satisfied, so that the power consumption may be reduced or security increased.

The controller 110 may receive the first image captured by the camera 100 (1100).

In this case, the first image may include a face of a user.

The controller 110 may be configured to, upon determining that the user's face may not be directed to the front, or a part of the user's face may not be included in the first image based on a result of processing the first image, control the user interface device 130 to request the user to retake the image.

The controller 110 may be configured to compare the first image with at least one reference face image based on the face authentication process being started (1200). The at least one reference face image may include a reference face image manually registered through a face registration process performed by a user and a reference face image automatically registered by the face authentication system 1 according to the exemplary embodiment.

A method of automatically storing a reference face image by the face authentication system 1 according to the embodiment will be described below.

As described above, the controller 110 may determine the similarity score based on the comparison of the first image with the at least one reference face image.

The controller 110 may be configured to, based on the similarity score between the first image and the at least one reference face image, determine whether face authentication may be successful and also determine whether to automatically store a reference face image.

Referring to FIG. 3, a criterion for determination of the face authentication process according to the similarity score may be shown. The system may be configured to segment the possible similarity scores into different sections, B1, B2, B3, B4, B5, and B6 as illustrated in FIG. 3 representing the span of available similarity scores from a minimum value (0 as illustrated) representing no similarity and a maximum value (1 as illustrated) representing a maximum similarity. The segments may be of equal, different, or a combination of equal and different sizes. For example B3 is illustrated as the smallest segment compared to all of the other segments.

When the similarity score corresponds to section B1, the lowest similarity region, the authentication target may be determined to be another person who does not resemble the genuine user.

When the similarity score corresponds to section B2, the second to lowest similarity region, the authentication target may be determined to be another person who partially resembles the genuine user.

When the similarity score corresponds to section B3, the third lowest similarity region or a middle similarity region, the authentication target may be determined to be another person who may be very similar to the genuine user.

When the similarity score corresponds to section B4, the third highest similarity region or a middle similarity region, the authentication target may be determined to be another person who has an appearance almost similar to that of the genuine user, or the authentication target may be determined to be the genuine user but have a low reliability according to external environmental condition.

When the similarity score corresponds to B5 section, the second highest similarity region, the authentication object may be determined to correspond to the genuine user, but have a change in an appearance and/or in an environment.

When the similarity score corresponds to section B6, the highest similarity region, the authentication object may be determined to correspond to the genuine user.

In an embodiment, a first threshold value may refer to a threshold value for determining whether face authentication may be successful. When the similarity score corresponds to an authentication failure section a1 smaller than the first threshold value, the face authentication may fail, and when the similarity score corresponds to an authentication success section a2 greater than or equal to the first threshold value, the face authentication may be successful.

An automatic registration section a2 and a registration intention checking section a4 will be described below.

The controller 110 may be configured to, when the similarity score may be greater than or equal to the first threshold value (Yes in operation 1300), determine that the face authentication may be successful (1420), and when the similarity score may be less than the first threshold value (No in operation 1300), determine that the face authentication fails (1550).

A second threshold value corresponds to a threshold value for estimating that the face included in the first image corresponds to the face of the genuine user, but a change in appearance and/or environment of the user has occurred.

The controller 110 may be configured to, when the similarity score may be greater than or equal to the first threshold value and less than the second threshold value, determine that the user's face included in the first image matches the reference face included in the reference face image, but the similarity may be relatively low.

A third threshold value may be a threshold value for estimating that the face authentication based on the first image fails but the face included in the first image may be the face of another person similar in appearance to the real user or may be the face of the genuine user under the condition of a great environment change.

The controller 110 may be configured to, when the similarity score may be less than the first threshold value and greater than the third threshold value, estimate that the face included in the first image may be the face of another person similar in appearance to the real user or may be the face of the genuine user under the condition of a great environment change.

The first threshold value, the second threshold value, and/or the third threshold value may be values previously stored in the memory of the controller 110 and/or the storage 120, and the values may be changed according to software update or learning of a learning model.

Referring again to FIG. 2, the controller 110 may be configured to, when the similarity score may be greater than the first threshold value and less than the second threshold value (Yes in operation 1400), register the first image as the reference face image (1410).

That is, the face authentication system 1 may register the first image as the reference face image when the similarity score corresponds to the automatic registration section a2.

In the present specification, the registering of the first image as a reference face image refers to registering the first image as an additional reference face image while preserving the reference face images directly registered by the user through the face registration process.

The first image registered as the reference face image may be a target to be compared with an image newly acquired from the camera 100 when a face authentication process may be performed at a later time.

That is, the controller 110 may be configured to compare the first image registered as a reference face image with a user's face image obtained from the camera 100 in a further face authentication process to calculate a similarity score, and determine whether the face authentication according to the similarity score may be successful.

According to the present disclosure, by automatically registering the first image as the reference face image without manual manipulation of the user, the authentication success rate in the future face authentication process may be improved. That is, in response to the similarity score of the first image being less than the second threshold value, it may be estimated that there may be a change in the user's appearance (e.g., beard, haircut, glasses, accessories, etc.), and thus the first image including feature points of the changed appearance may be used as another reference face image to thereby improve the authentication success rate in the future face authentication process.

According to various embodiments, the controller 110 may be configured to, only when all of the eyes, nose, and mouth may be detected from the user's face recognized based on a result of processing the first image, store the first image as at least one reference face image in the storage 120. Accordingly, the security of the face authentication system 1 may be improved.

In addition, since the first image may be registered as the reference face image only when the similarity score corresponds to the automatic registration section a2, the limited storage space may be efficiently used.

According to various embodiments, the controller 110 may be configured to, in response to the similarity score being less than the first threshold value (No in operation 1300), determine that the face authentication has failed (1550). However, when a specific condition may be satisfied, the intention of the user may be checked so that the first image may be registered as a reference face image.

For example, the controller 110 may be configured to, based on an user authentication succeeding by another authentication device (Yes in operation 1510) while the similarity score may be less than the first threshold value and greater than the third threshold value (Yes in 1500), control the display 131 (e.g., at least one display) to output a visual indication for inquiring whether there may be an intention to register the first image as the reference face image (1520).

That is, the face authentication system 1 may be configured to, when the similarity score corresponds to the registration intention checking section a4, inquire the user about an intention to register the first image, and then determine whether to use the first image as the reference face image according to a response of the user.

When the similarity score corresponds to the registration intention checking section a4, since the authentication target may be another person who has an appearance almost similar to the genuine user, or the authentication target may be the genuine user but have a low reliability according to external environmental conditions, the user may be inquired whether the authentication target included in the first image may be a real user so that the reliability may be secured.

In addition, even when the similarity score corresponds to the registration intention checking section a4, the face authentication system 1 may not check the intention to register the first image unless it may be identified by another authentication device that the authentication target is the genuine user.

In this case, the other authentication device may refer to other biometric authentication devices (e.g., iris recognition, fingerprint recognition, etc.) or manual authentication devices (e.g., password, pattern, etc.) through the in putter 132.

In one embodiment, the face authentication system 1 may include a communication module for receiving an authentication result from the other authentication devices.

As an example, in the case of the face authentication system 1 mounted on the vehicle 3, the face authentication system 1 may receive information about authentication results of other authentication systems (e.g., a fingerprint authentication system, an iris authentication system, and a smart key authentication system).

According to various embodiments, in the case of the face authentication system 1 being mounted on the vehicle 3, the face authentication system 1 temporarily stores the first image, which has a similarity score corresponding to the registration intention checking section a4, in the memory, and in response to the user starting the vehicle 3, control the display 131 (e.g., an AVN device) to display the first image, and output a visual indication for inquiring the user's intention to register the first image.

Referring to FIG. 4, when an authentication fails based on the first image corresponding to the registration intention checking section a4, and then an authentication succeeds by another authentication device (e.g., when a user starts the vehicle 3), the user interface device 130 may output a visual indication (e.g., a text) for inquiring about a user's registration intention together with the first image.

The user may express his/her intention through the buttons 130*a* and 130*b* provided in the user interface device 130, but the method of expressing the user's intention may not be limited thereto.

For example, the user may express his/her intention through a speech command.

The controller 110 may be configured to, based on a user input indicating an affirmative intention being received through the first button 130*a*, register the first image as a reference face image.

That is, the controller 110 may be configured to, based on a user input indicating that the user intends to register the first image as the reference face image being received (Yes in operation 1530), register the first image as the reference face image (1540).

In addition, the controller 110 may be configured to, based on a user input indicating a denial intention being received through the second button 130*b* (NO in operation 1530), terminate the procedure without registering the first image as the reference face image.

According to the present disclosure, in a case when the authentication target may be another person who has an appearance almost similar to the genuine user or the authentication target may be the genuine user but has a low reliability according to external environmental conditions, the user's intention may be checked to use the first image so that the authentication success rate in the future face authentication process may be improved.

In addition, according to the present disclosure, in the case when the similarity score of the first image corresponds to the registration intention checking section a4, the user's intention to register to the first image may be checked only when the authentication may be completed by another authentication device, so that the security of the face authentication system 1 may be ensured.

According to the image automatic registration process of the face authentication system 1 shown in FIG. 2, the reference face image may be automatically updated in response to a change in the user's appearance or in the surrounding environment conditions to thereby increase the authentication success rate of the future face authentication process.

Figure 5:
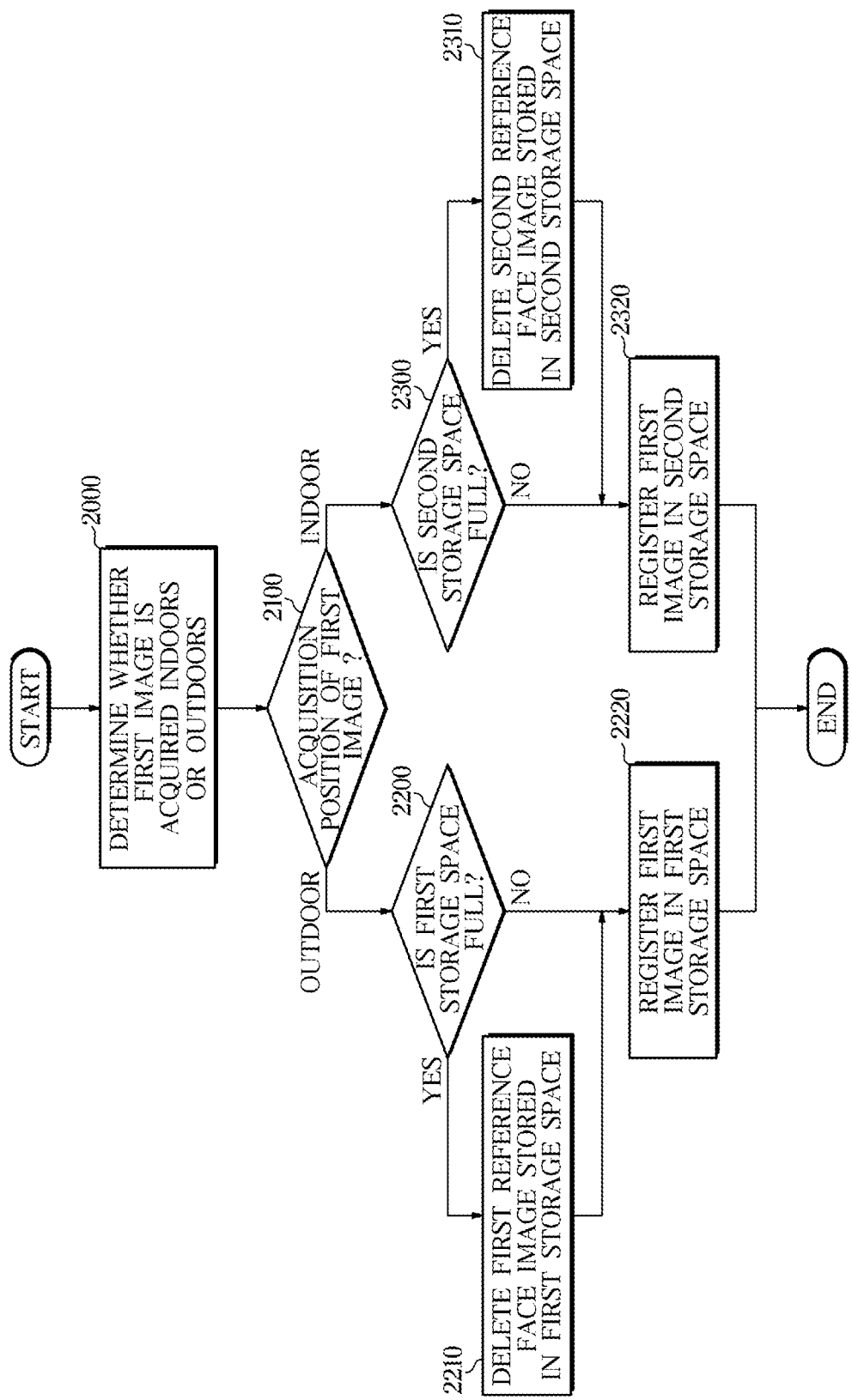
FIG. 5 is a flowchart showing a method of automatically registering a reference face image by a face authentication system according to an exemplary embodiment of the disclosure.
Figure 6:
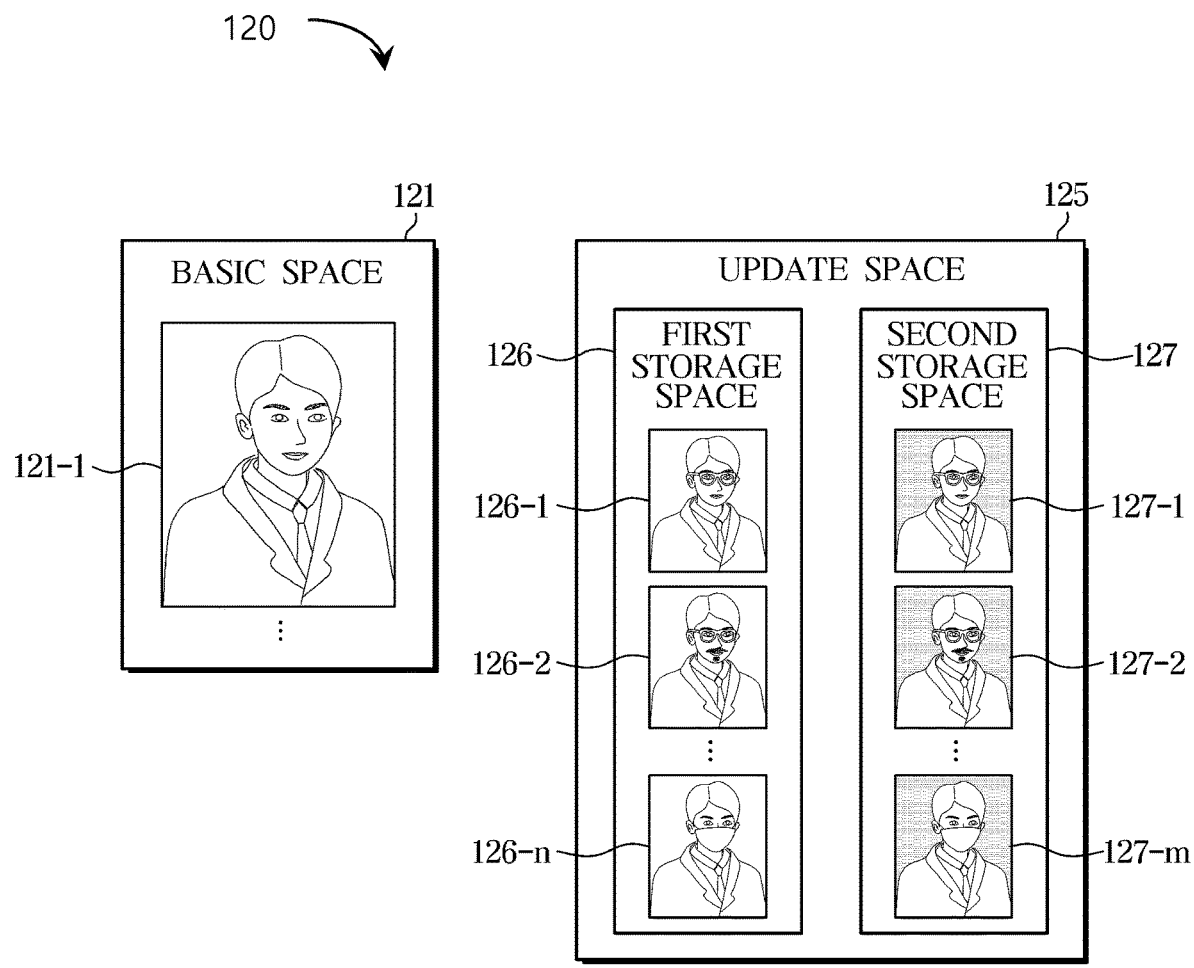
FIG. 6 is a diagram for describing a storage space of a storage of a face authentication system according to an exemplary embodiment of the disclosure.
Figure 7:
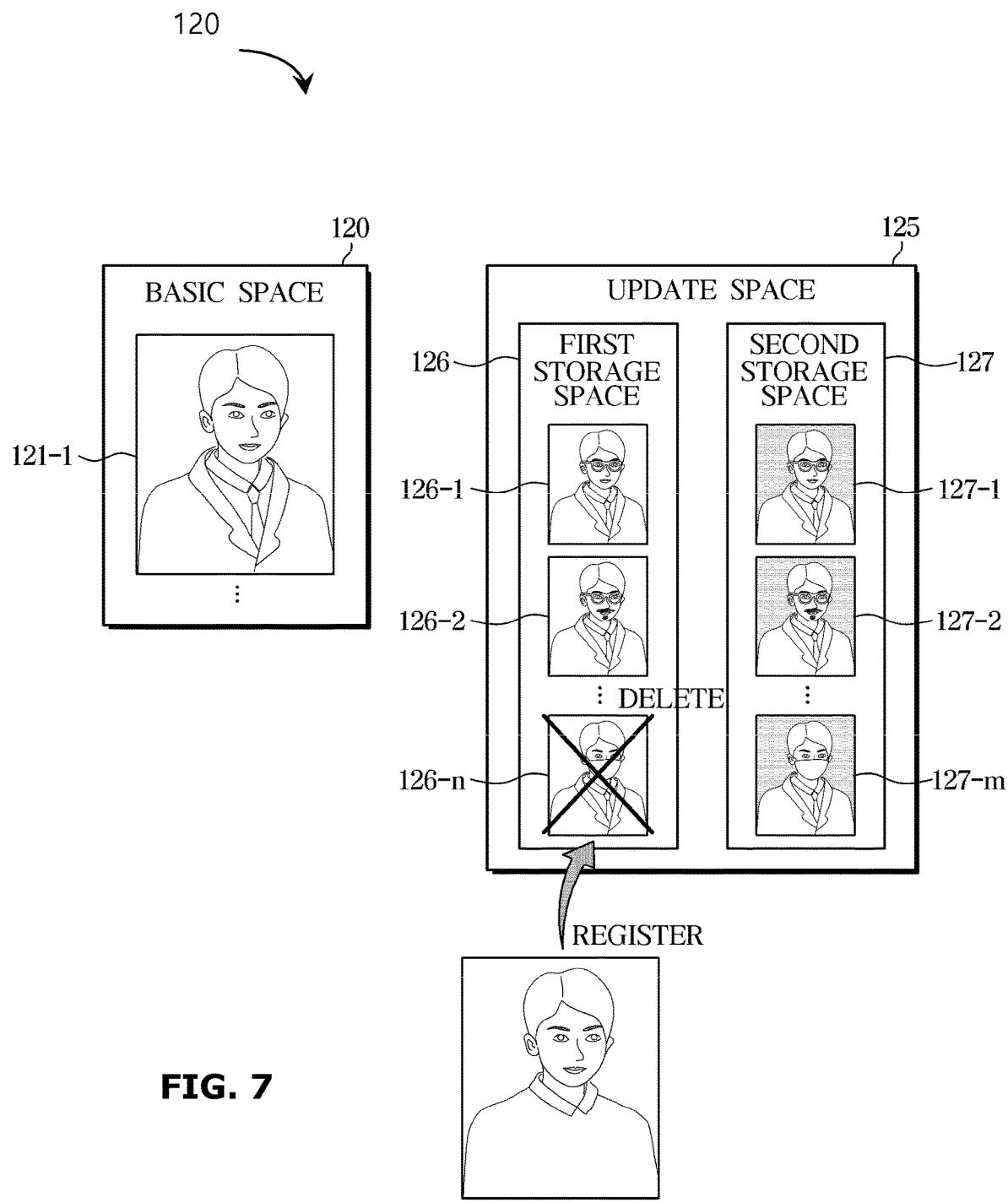
FIG. 7 is a diagram illustrating an operation of automatically deleting a reference face image when a storage space is full in a face authentication system according to an exemplary embodiment of the disclosure.

FIG. 5 is a flowchart showing illustrating a method automatically registering a reference face image by a face authentication system according to an embodiment. FIG. 6 is a diagram for describing a storage space of a storage of a face authentication system according to an embodiment. FIG. 7 is a diagram illustrating an operation of automatically deleting a reference face image when a storage space may be full in a face authentication system according to an embodiment.

Referring to FIGS. 5 to 7, an example of a method of storing a first image as a reference face image will be described.

The controller 110 may be configure to, when storing the first image as a reference face image (1410 and 1540 in FIG. 2), classify the first image according to a preset condition, and determine a storage space to store the first image according to a result of the classification.

The controller 110 may inspect the first image according to a preset criterion while performing the face authentication process. For example, the controller 110 may inspect at least one of the detection position of the face region, the presence or absence of an occluded region (e.g., a mask or glasses) in the facial region, the facial expression displayed in the face region, user information (e.g., the gender or age), the illumination state of the first image, and the image quality (e.g., the level of blurriness) of the first image. Such inspection items may be inspected using a neural network trained according to the purpose of each inspection item or an image quality assessment (IQA).

The face authentication system 1 may classify the first image into one of a plurality of categories according to results of the inspection items, such as the presence of an occluded region, facial expressions, user information, illumination state, and/or image quality of the face region of the first image, and store the first image in a storage space corresponding to the classified category.

The inspection items serving as criteria for classifying the first image may not be limited to those described above, and may be added or changed according to various embodiments.

Meanwhile, among the above-described inspection items, the illumination state may act as a major factor of reducing the success rate of face authentication.

Accordingly, the face authentication system 1 according to the embodiment may adopt, as the category classification criterion of the first image, whether the image acquisition place of the first image may be indoors or outdoors, but the classification criterion may not be limited thereto.

Referring to FIG. 5, the controller 110 may determine whether the first image may be acquired indoors or outdoors (2000).

As an example, the controller 110 may determine whether the first image may be acquired indoors or outdoors, based on processing of the first image to perform the face authentication process as described above.

For example, the controller 110 may determine whether the first image may be acquired indoors or outdoors based on the brightness and/or saturation of the first image.

As another example, the controller 110 may receive information about an exposure value from the camera 100 and determine whether the first image may be acquired indoors or outdoors based on the information about the exposure value.

For example, when the exposure value of the camera 100 set to acquire the first image may be smaller than a preset value, the controller 110 may determine that the first image has been acquired outdoors, and when the exposure value may be greater than the preset value, the controller 110 may determine that the first image has been acquired indoors.

The controller 110 may be configured to, upon determining that the first image has been acquired outdoors (YES in operation 2100), register the first image in a first storage space 126 of the storage 120 (2220).

In addition, the controller 110 may be configured to, upon determining that the first image has been acquired indoors (YES in operation 2200), register the first image in a second storage space 127 of the storage 120 (2320).

Referring to FIG. 6, the storage space of the storage 120 may be divided into a plurality of categories. In this case, different storage spaces may be understood as being not only physically separated by hardware but also separated by software.

As an example, the storage space of the storage 120 may include a basic storage space 121 for storing a reference face image 121-1 manually registered by a user through a face registration process, and an update storage space 125 for storing a reference face image automatically registered according to the automatic storage method of the face authentication system 1 according to the embodiment.

The reference face image 121-1 stored in the basic storage space 121 may be deleted only by a user's manual operation. That is, the reference face image 121-1 stored in the basic storage space 121 may be deleted only when the user inputs a command to delete the reference face image 121-1 through the user interface device 130.

According to a user's intention, a plurality of reference face images for a single user may be stored in the basic storage space 121, or at least one reference face image for each of a plurality of users may be stored.

The update storage space 125 may include a plurality of storage spaces (e.g., the first storage space 126 and the second storage space 127) classified according to a plurality of categories.

As an example, at least one reference face image classified as being acquired outdoors may be stored in the first storage space 126, and at least one reference face image classified as being acquired indoors may be stored in the second storage space 127, but the disclosure may not be limited thereto. In addition, the number of storage spaces included in the update storage space 125 may not be limited to two.

For example, a reference face image classified as an image with glasses in the face region may be stored in the first storage space 126, and a reference face image classified as an image with a mask in the face region may be stored in the second storage space 127.

As another example, a reference face image classified as an image with an accessory existing in the face region may be stored in a third storage space, and a reference face image classified as an image with a beard existing in the face region may be stored in a fourth storage space In an embodiment, n reference face images (n may be a natural number) 126-1, 126-2, . . . , and 126-*n* acquired outdoors may be stored in the first storage space 126, m reference face images (m may be a natural number) 127-1, 127-2, . . . , and 127-*m* acquired indoors may be stored in the second storage space 127.

In this case, n, which may be the maximum number of images that may be stored in the first storage space 126 and m, which may be the maximum number of images that may be stored in the second storage space 127, may be the same or different.

For example, n and m may be preset based on a place in which the user mainly performs face authentication. When the face authentication system 1 may be mounted on the vehicle 3, it may be estimated that the number of times that the user performs face authentication outdoors may be greater than the number of times that the user performs face authentication indoors, so n may be greater than m. For example, n may be set to about 3 and m may be set to about 5, but the disclosure may not be limited thereto.

As will be described below, at least one reference face image (hereinafter, 'first reference face image') stored in the first storage space 126 and at least one reference face image (hereinafter referred to as 'second reference face image') stored in the second storage space 127 may be automatically deleted in response to a new reference face image being registered.

According to the present disclosure, by storing a limited number of reference face images in the first storage space 126 and the second storage space 127, reference face images may be prevented from being indiscriminately stored, to prevent the security of the face authentication system 1 from being weakened.

On the other hand, when the reference face image in the first category (e.g., the reference face image acquired in the indoor space) may be plural, and the reference face image in the second category (e.g., the reference face image acquired in the outdoor space) may be only one, and a reference face image, which will be newly stored, may be stored in the update storage space 125 without being classified according to categories, the reference face image in the second category, which may be the only one reference face image existing in the second category, may be automatically deleted even though the plurality of reference face images in the first category exist.

According to the present disclosure, by allowing reference face images of different categories to be stored in a plurality of storage spaces having different categories, the face recognition success rate may be improved despite the user's various appearance change conditions and/or environmental conditions.

Referring to FIG. 7, when it may be determined that the first image has been acquired outdoors, and the first storage space 126 may be full (Yes in operation 2200), the controller 110 may delete a first reference face image 126-1, 126-2, . . . , or 126-*n* among the plurality of first reference face images 126-1, 126-2, . . . , and 126-*n* stored in the first storage space 126 (2210), and thus may register the first image in the first storage space 126 as a new first reference face image (2220).

That is, the face authentication system 1 according to the embodiment may be configured to, when the first storage space 126 may be full, delete a first reference face image 126-1, 126-2, . . . or 126-*n* among the plurality of first reference face images 126-1, 126-2, . . . , and 126-*n* to register the first image in the first storage space 126.

According to various embodiments of the present disclosure, the controller 110 may determine a first reference face image 126-1, 126-2, . . . , or 126-*n* that may be targeted for deletion from among the plurality of first reference face images 126-1, 126-2, . . . , and 126-*n* according to a preset criterion.

In an embodiment, the controller 110 may be configured to, based on at least one of: a storage time of a respective one of the plurality of first reference face images 126-1, 126-2, . . . , and 126-*n*; or a cumulative average value of a similarity score calculated using a respective one of the plurality of first reference face images 126-1, 126-2, . . . , 126-*n*, determine the first reference face image 126-1, 126-2, . . . , or 126-*n* that may be targeted for the deletion.

For example, the controller 110 may determine a first reference face image stored the earliest among the plurality of first reference face images 126-1, 126-2, . . . and 126-*n* as the first reference face image targeted for the deletion.

According to the present disclosure, the first reference face image stored the earliest may be replaced with the most recently acquired first reference face image, to reflect the latest appearance condition and/or the latest environmental condition.

As another example, the controller 110 may determine, as the first reference face image targeted for the deletion, a first reference face image among the plurality of first reference face images 126-1, 126-2, . . . , and 126-*n* which has the lowest cumulative average value of the similarity score calculated using the corresponding one of the first reference face images 126-1, 126-2, . . . and, 126-*n*.

The cumulative average value of the similarity score calculated using the respective one of the plurality of first reference face images 126-1, 126-2, . . . , and 126-*n* may represent a cumulative average value of at least one similarity score calculated when the user performs the face authentication process at least once using a 1-1 reference face image 126-1, a cumulative average value of at least one similarity score calculated when the user performs the face authentication process at least once using a 1-2 reference face image 126-2, and a cumulative average value of at least one similarity score calculated when the user performs the face authentication process at least once using a 1-$n$ reference face images 126-$n$.

For example, when the user performs the face authentication process four times using the 1-1 reference face image 126-1, and four similarity scores may be calculated as {0.7, 0.5, 0.6, 0.6}, the cumulative average value may correspond to 0.6.

According to the present disclosure, by deleting a first reference face image having the lowest matching rate with the face image input by the user to perform face authentication, the user's latest appearance condition and/or the latest environmental condition may be reflected.

As another example, the controller 110 may be configured to calculate the importance of each of the plurality of first reference face images 126-1, 126-2, . . . and 126-$n$ based on the storage time and the cumulative average value of the similarity score of each of the plurality of first reference face images 126-1, 126-2, . . . and 126-$n$, and determine a first reference face image having the lowest importance as a target for the deletion.

Specifically, the controller 110 may calculate a first value corresponding to the storage time of each of the plurality of first reference face images 126-1, 126-2, . . . , and 126-$n$ and a second value corresponding to the cumulative average value of the similarity score of each of the plurality of first reference face images 126-1, 126-2, . . . , and 126-$n$, and determine a first reference face image having the lowest sum of the first value and the second value as the first reference face image targeted for the deletion.

The controller 110 may assign a lower first value to an earlier storage time, and assign a lower second value to a lower cumulative average value.

For example, the controller 110 may assign 0.5 points when the storage time of the first reference face image may be one year ago, assign 0.7 points when the storage time may be six months ago, and assign 1 point when the storage time may be three months ago, and may also assign 1 point when the cumulative average value of the similarity score calculated based on the first reference face image may be 0.8 or more, assign 0.7 points when the cumulative average value of the similarity score may be 0.75 or more, and assign 0.5 points when the cumulative average value of the similarity score may be 0.7 or more.

A method of calculating the first value corresponding to the storage time and the second value corresponding to the cumulative average value of the similarity score may be employed without limitation, and a related lookup table may be stored in the memory.

According to the present disclosure, by deleting the first reference face image having the lowest importance among the plurality of first reference face images based on the storage time and the matching rate, the user's latest appearance condition and/or the latest environmental condition may be reflected.

Similarly, when it may be determined that the first image has been acquired indoors, and the second storage space 126 may be full (Yes in operation 2300), the controller 110 may delete a second reference image 127-1, 127-2, . . . , or 127-$m$ among the plurality of second reference images 127-1, 127-2, . . . , and 127-$m$ stored in the second storage space 127 (2310), and thus may register the first image in the second storage space 127 as a new second reference face image (2320).

That is, the face authentication system 1 according to the embodiment may be configured to, when the second storage space 127 may be full, delete one of the plurality of second reference face images 127-1, 127-2, . . . , and 127-$n$ to register the first image in the second storage space 127.

According to various embodiments of the present disclosure, the controller 110 may determine a second reference face image targeted for the deletion among the plurality of second reference face images 127-1, 127-2, . . . and 127-$m$ according to a preset criterion. Since the preset criterion may be the same as the criterion for determining the first reference face image targeted for the deletion as described above, descriptions thereof will be omitted.

Figure 8:
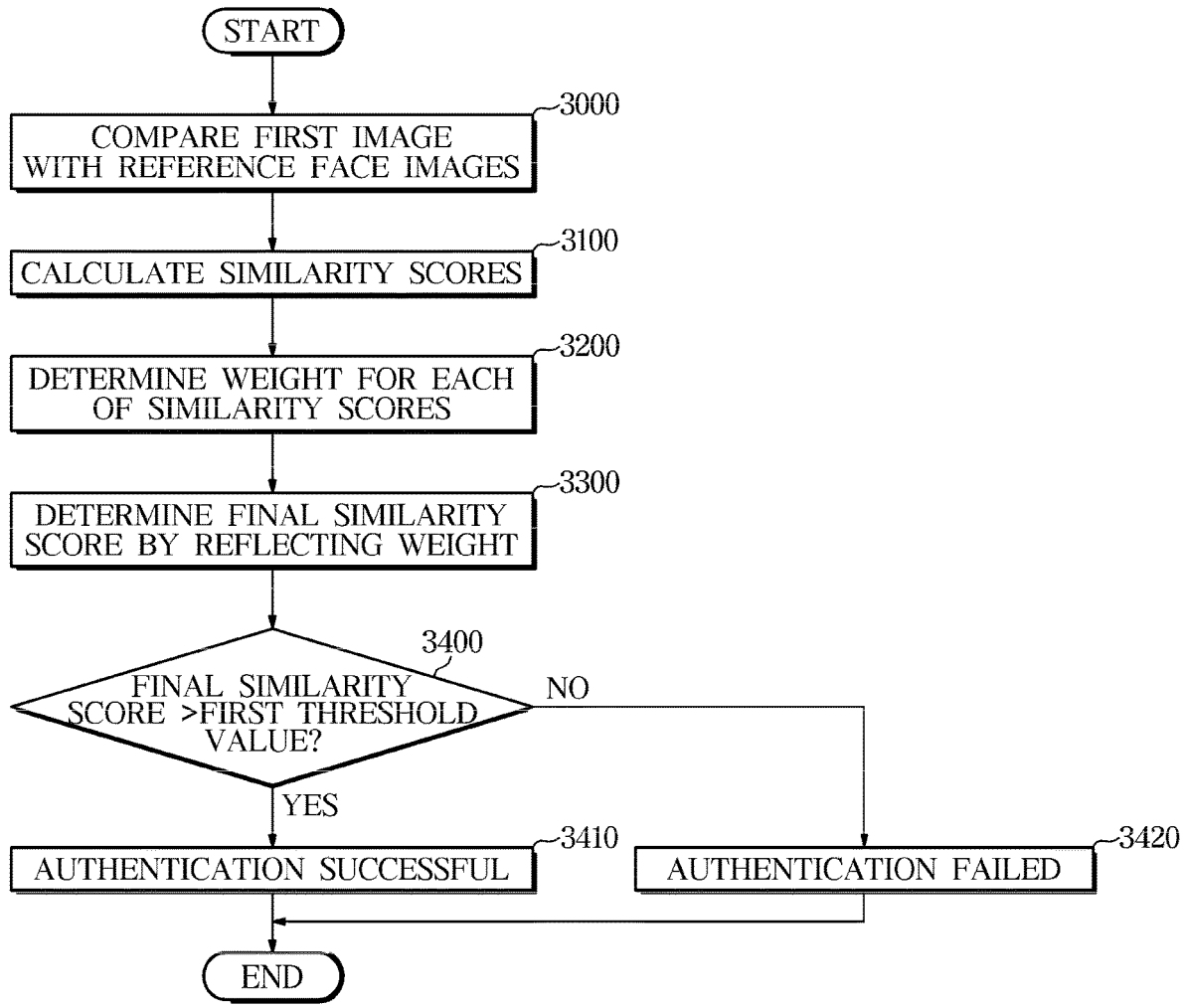
FIG. 8 is a flowchart showing a method of performing face authentication by a face authentication system according to an exemplary embodiment of the disclosure.
Figure 9:
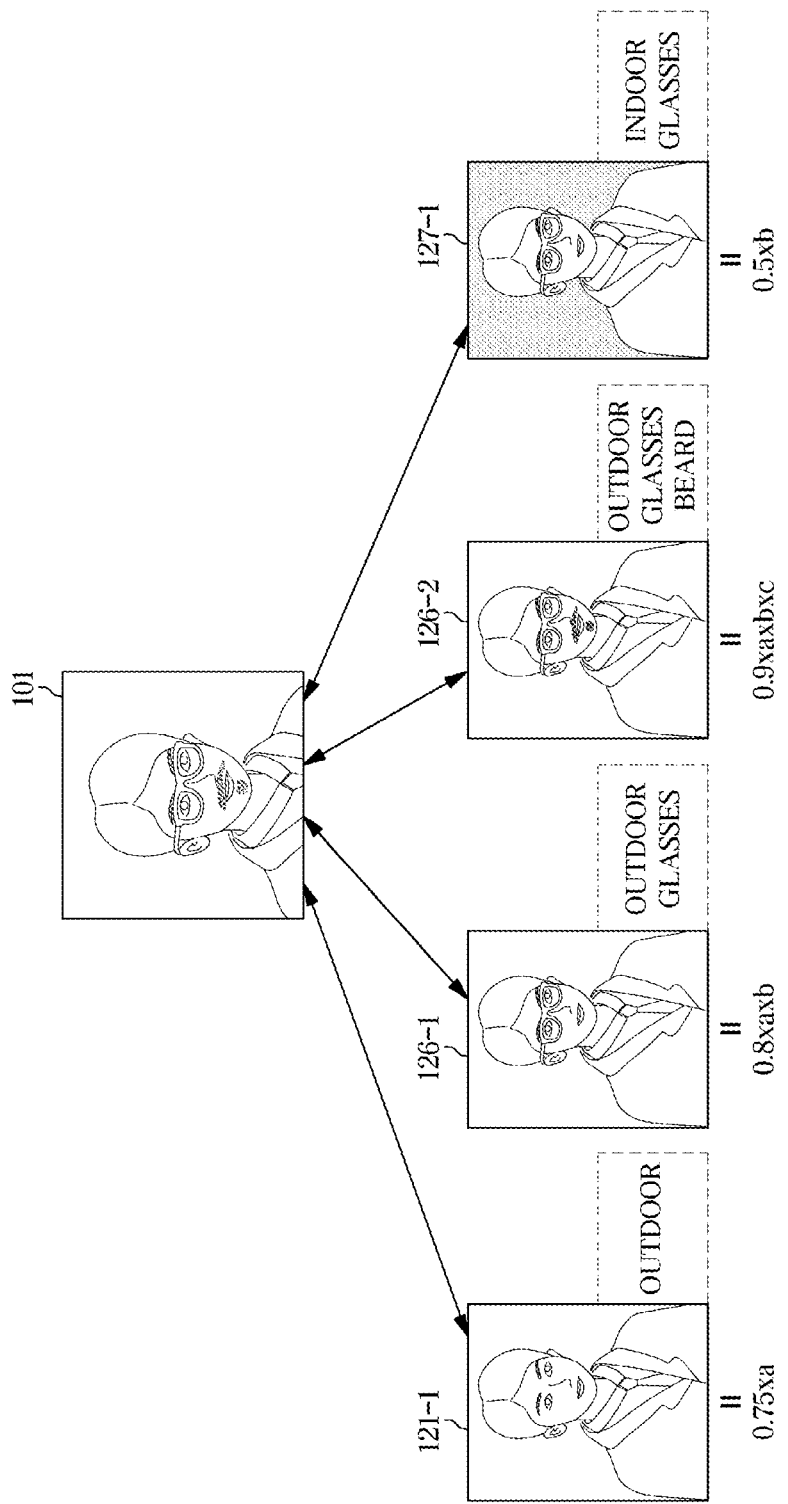
FIG. 9 is a diagram for describing a method of assigning weights to each of a plurality of similarity scores by a face authentication system according to an exemplary embodiment of the disclosure.

FIG. 8 is a flowchart showing a method of performing face authentication by a face authentication system according to an embodiment. FIG. 9 is a diagram for describing a method of assigning weights to each of a plurality of similarity scores by a face authentication system according to an embodiment.

Referring to FIGS. 8 and 9, an example of a face authentication method using a plurality of reference face images will be described.

According to various embodiments, the controller 110 may compare a first image 101 with each of the plurality of reference face images (3000).

The controller 110 may calculate a plurality of similarity scores based on the comparison between the first image 101 and each of the plurality of reference face images (3100).

Specifically, the controller 110 may compare the first image 101 with a default reference face image 121-1 stored in the basic storage space 121 to calculate a similarity score, or may compare the first image 101 with at least one reference face image 126-1, 126-2, . . . , 126-$n$, 127-1, 127-2, . . . and 127-$m$ stored in the update storage space 125 to calculate n+m similarity scores.

In an embodiment, the controller 110 may determine that the face authentication may be successful based on at least one similarity score being greater than the first threshold value among the plurality of similarity scores.

In other words, the face authentication system 1 according to the embodiment may be configured to, in response to even a single reference face image among the plurality of reference face images having a similarity score with the first image 101 that may be greater than or equal the first threshold value, determine that the face authentication may be successful.

In this case, the controller 110 may be configured to, when at least one similarity score greater than the first threshold value exists among the plurality of similarity scores while all of the plurality of similarity scores may be less than the second threshold value, register the first image 101 in the storage 120 as a reference face image.

According to the present embodiment, the face authentication success rate may be improved to be robust to a change in the user's appearance or a change in the first image acquisition condition (hereinafter, 'environmental condition'), but the security may be weakened.

Accordingly, the controller 110 according to another embodiment may determine that the face authentication may be successful in response to the average value of the plurality of similarity scores being greater than the first threshold value.

According to the present embodiment, the authentication success rate may be maintained robust to a change in the user's appearance or environmental conditions to some extent while compensating for the weakness in the security.

According to various embodiments, the controller 110 may be configured to, when determining whether face authentication may be successful based on the average value of the plurality of similarity scores, assign a weight to each of the plurality of similarity scores based on at least one of the acquisition condition of the first image 101 and/or the appearance condition of the user included in the first image 101, and calculate the average value, so that the authentication success rate may be further improved while compensating for the weakness of the security of the face authentication system 1.

Referring again to FIG. 8, the controller 110 may determine at least one of the acquisition condition of the first image 101 or the appearance condition of the user included in the first image 101 based on the processing of the first image 101, and determine a weight for each of the plurality of similarity scores based on the at least one of the acquisition condition of the first image 101 or the user's appearance condition (3200).

The controller 110 may determine the average value of the plurality of similarity scores by reflecting the weight in each of the plurality of similarity scores, and determine the average value of the plurality of similarity scores in which the weights may be reflected as the final similarity score (3300).

The controller 110 may determine that the face authentication may be successful based on the final similarity score being greater than or equal to the first threshold value (YES in operation 3400), and based on the final similarity score being smaller than the first threshold value (NO in operation 3400), determine that authentication has failed (3420).

Hereinafter, a method of reflecting a weight in each similarity score will be described with reference to FIG. 9. For the sake of convenience in description, it may be assumed that a default reference face image 121-1 may be stored in the basic storage space 121, and two first reference face images 126-1 and 126-2 may be stored in the first storage space 126, and a single second reference face image 127-1 may be stored in the second storage space 127.

Referring to FIG. 9, the controller 110 may determine the acquisition condition (e.g., outdoor) of the first image 101 and the user's appearance condition (e.g., glasses, beard) included in the first image 101 based on the processing of the first image 101.

As described above, the feature values for the reference face images 121-1, 126-1, 126-2, and 127-1 may be stored in the storage 120, so that the controller 110 may determine whether the conditions of the reference face images 121-1, 126-1, 126-2, and 127-1 match the condition of the first image 101.

For example, the default reference face image 121-1 registered outdoors by the user who does not wear glasses and does not grow a beard matches the first image 101 only on the "outdoor condition". In addition, the 1-1 reference face image 126-1 automatically registered outdoors in a state in which the user wears glasses and does not grow a beard matches the first image 101 on the "outdoor condition" and "glasses condition". In addition, the 1-2 reference face image 126-2 automatically registered outdoors in a state in which the user wears glasses and grows a beard matches the first image 101 on the "outdoor condition", "glasses condition" and "beard condition". In addition, the 2-1 reference face image 127-1 automatically registered indoors in a state in which the user wears glasses and does not grow a beard matches the first image 101 only on the "glasses condition".

The controller 110 may assign the similarity scores calculated from the reference face images 121-1, 126-1, 126-2, and 127-1, respectively, with weights according to whether a condition may be matched.

For example, the controller 110 may apply a weight a when the "outdoor condition" may be matched, apply a weight b when the "glasses condition" may be matched, and apply a weight c when the "beard condition" may be matched. The weight value for each condition may be stored in a memory.

The controller 110 may be configured to, when the similarity score calculated based on the first image 101 and the default reference face image 121-1 corresponds to 0.75, reflect the weight a in the calculated similarity score 0.75 to change the similarity score calculated from the default reference face image 121-1.

Similarly, the controller 110 may be configured to, when the similarity score calculated based on the first image 101 and the 1-1 reference face image 126-1 corresponds to 0.8, reflect the weights a and b in the calculated similarity score 0.8, and when the similarity score calculated based on the first image 101 and the 1-2 reference face image 126-2 corresponds to 0.9, reflect the weights a, b, and c in the calculated similarity score 0.9, and when the similarity score calculated based on the first image 101 and the 2-1 reference face image 127-1 corresponds to 0.5, reflect the weight b in the calculated similarity score 0.5.

According to the present embodiment, by assigning a weight to a reference face image that may be the most optimally matched with the acquisition condition of the face image of the user or and/or the user's appearance condition, the authentication success rate may be improved.

In addition, according to various embodiments, the user may check the automatically registered reference face images through the user interface device 130, and manually delete the registered reference face images.

Meanwhile, the face authentication system 1 described above may be mounted in various devices and utilized.

Figure 10:
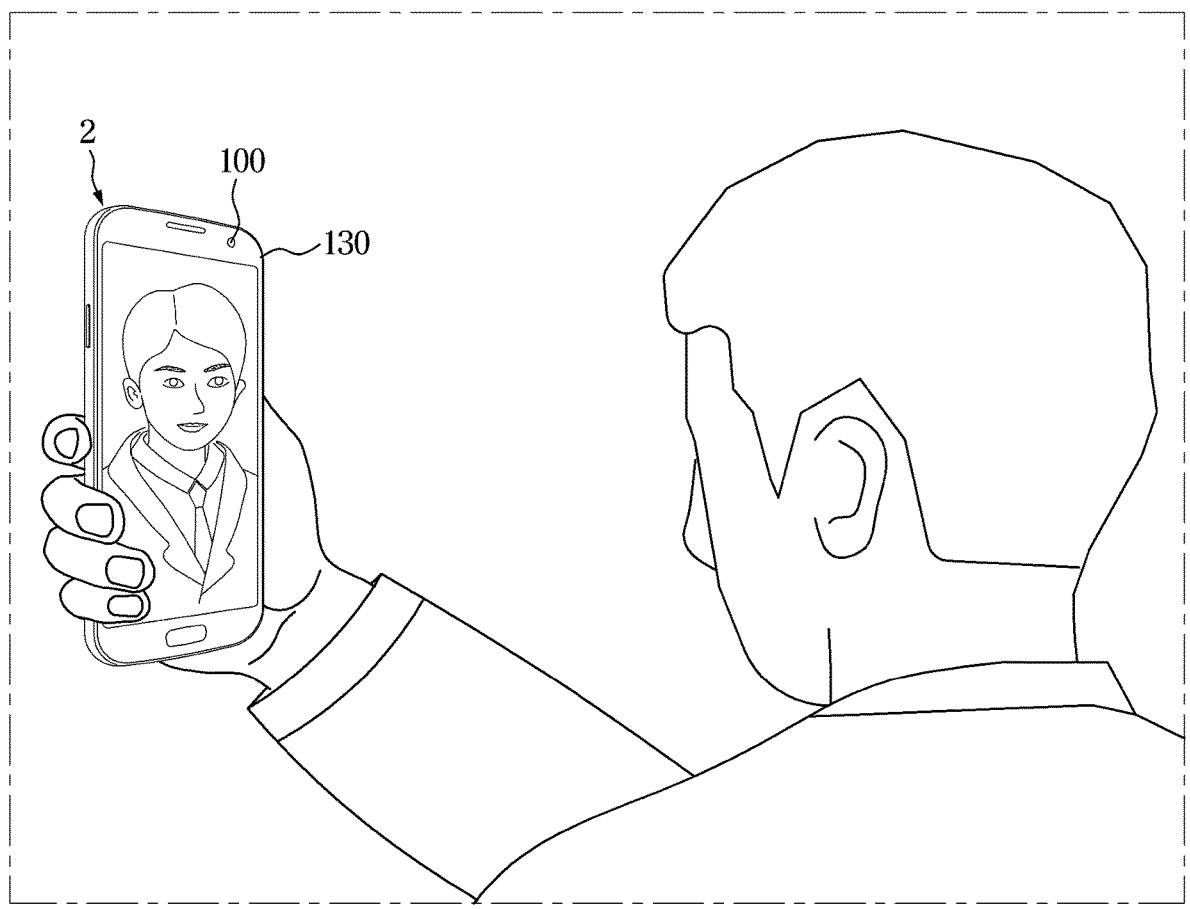
FIG. 10 is a view illustrating an electronic device equipped with a face authentication system according to an exemplary embodiment of the disclosure.

FIG. 10 may be a view illustrating an electronic device equipped with a face authentication system according to an embodiment.

Referring to FIG. 10, an electronic device 2 may include a face authentication system 1. The electronic device 2 may include, for example, a user terminal (a smart phone, notebook PC, laptop PC, etc.), and may include various computing devices.

The face authentication system 1 may be used for unlocking the electronic device 2 or performing identity verification for an application requiring security (e.g., an application related to banking).

Figure 11:
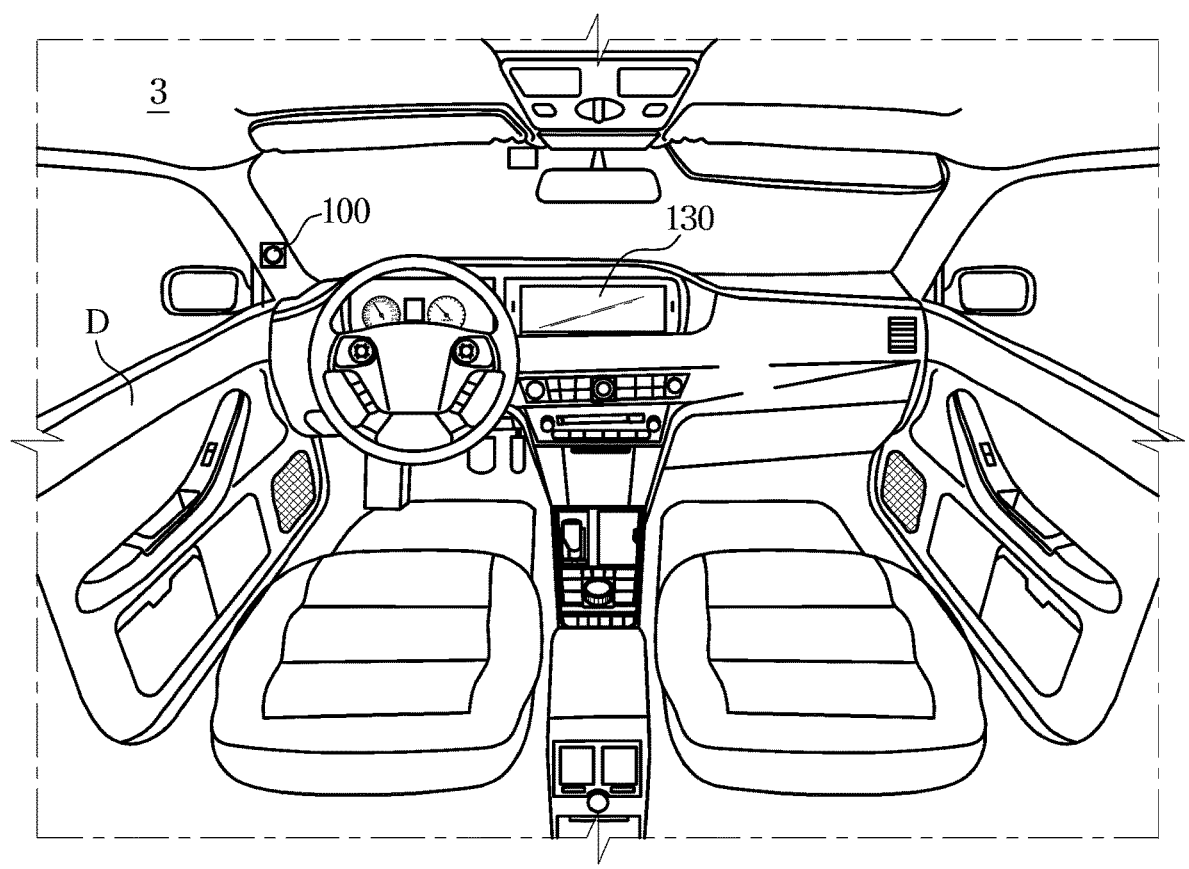
FIG. 11 is a view illustrating a vehicle equipped with a face authentication system according to an exemplary embodiment of the disclosure.

FIG. 11 is a view illustrating a vehicle equipped with a face authentication system according to an embodiment.

Referring to FIG. 11, a vehicle 3 may include a face authentication system 1.

When the face authentication system 1 may be mounted on the vehicle 3, a camera 100 may be provided on an A-pillar and/or B-pillar at a side of the driver's seat so that a user outside a door D and/or a user inside the door D may be photographed.

In addition, a user interface device 130 may be provided on the center fascia, the head unit, and/or the steering wheel of the vehicle 3, and may include, for example, an audio video navigation (AVN) device of the vehicle 3.

The face authentication system 1 may be used for unlocking the vehicle 3, performing identity verification for an application requiring security (e.g., an application related to banking) through the AVN device of the vehicle 3 or for starting the engine.

Figure 12:
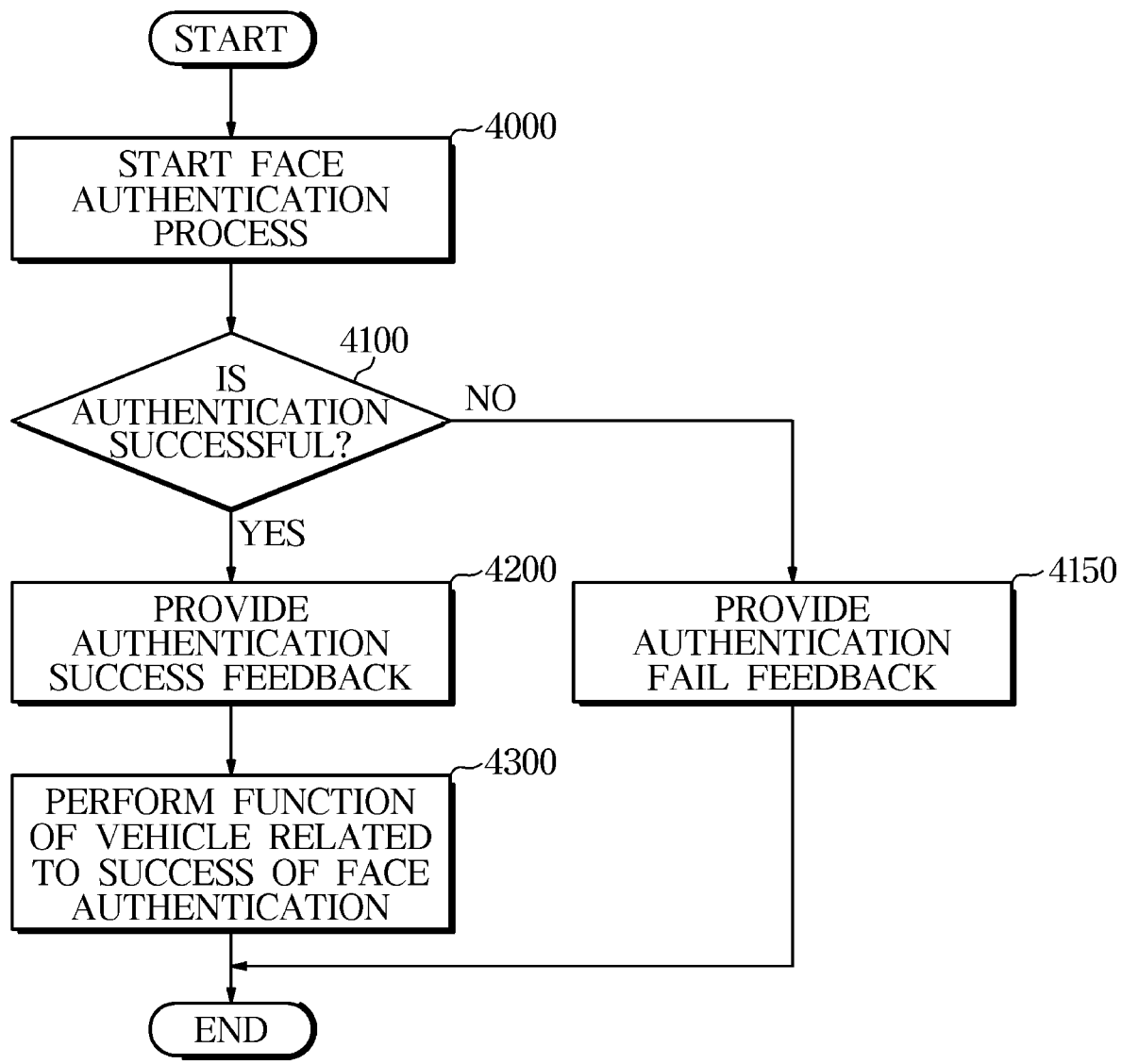
FIG. 12 is a flowchart showing a method of controlling a vehicle equipped with a face authentication system according to an exemplary embodiment of the disclosure.

FIG. 12 is a flowchart showing a method of controlling a vehicle equipped with a face authentication system according to an embodiment.

Referring to FIG. 12, the vehicle 3 according to an embodiment may be configured to, when a preset condition may be satisfied, start a face authentication process using the face authentication system 1 (4000).

For example, the vehicle 3 may start a face authentication process based on a touch input received by a touch sensor provided on a door handle, a proximity sensor detecting an object around the vehicle 3, or a smart key being located around the vehicle 3 in a state in which the door may be locked.

As another example, the vehicle 3 may start a face authentication process based on a user getting into the driver's seat in a state in which the engine may be turned off.

The vehicle 3 according to the embodiment may be configured to, based on the face authentication succeeding (Yes in operation 4100), provide the user with a feedback indicating that the face authentication may be successful (4200).

For example, the vehicle 3 may notify the user that the face authentication may be successful by outputting a visual indication indicating that the face authentication may be successful, or outputting a sound.

The vehicle 3 according to the embodiment may be configured to, based on the face authentication succeeding using the face authentication system 1 (Yes in operation 4100), perform a function of the vehicle 3 related to the success of the face authentication (4300).

As an example, the vehicle 3 may unlock the door of the vehicle 3 based on the face authentication of the user outside the vehicle 3 succeeding in a state in which the door may be locked. As another example, the vehicle 3 may start the vehicle 3 based on the face authentication of the user inside the vehicle 3 succeeding in a state in which the vehicle 3 may be turned off The vehicle 3 according to the embodiment may be configured to, based on the failure of the face authentication (No in operation 4100), provide the user with a feedback indicating that the face authentication has failed (4150).

Some of the components of the face authentication system 1 and the vehicle 3 may refer to a software component and/or a hardware component, such as a Field Programmable Gate Array (FPGA) and an Application Specific Integrated Circuit (ASIC).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer may be stored, for example, a Read Only Memory (ROM), a Random Access Memory (RAM), a magnetic tape, a magnetic disk, a flash memory, an optical data storage device, and the like.

As may be apparent from the above, according to the present disclosure, the success rate of face authentication may be improved even with the change of a user's appearance.

In addition, according to the present disclosure, the success rate of face authentication may be improved even with the change of an environment in which a face image of a user may be acquired.

In addition, according to the present disclosure, the security of face authentication may be improved.

In addition, according to the present disclosure, a reference face image of various conditions may be obtained using a limited storage space.

Exemplary embodiments described herein may refer or distinguish images taken indoors or outdoors. As used herein indoors may include a covered or enclosed area, whether partially for fully. For example, a parking garage that is an interior space may be considered indoors although not fully enclosed by windows and/or walls on all sides. As used herein, indoors may include spaces in which the interior lighting is predominantly from electrical lights, while outdoor locations may be assessed based on the lighting from the image being primarily from direct natural lighting sources, such as the sun.

Although embodiments of the present disclosure have been described for illustrative purposes, those skilled in the art will appreciate that various modifications, additions and substitutions may be possible, without departing from the scope and spirit of the disclosure. Therefore, embodiments of the present disclosure have not been described for limiting purposes.

What is claimed is:

1. A face authentication system comprising:
a camera configured to acquire a first image including a plurality of facial feature points for performing a face authentication process;
a storage configured to store and having stored thereon at least one reference face image; and
a controller configured to compare the first image with the at least one reference face image based on the face authentication process being started, determine a similarity score based on the plurality of facial feature points in the first image being compared with the at least one reference face image, determine that face authentication is successful in response to the similarity score being greater than a first threshold value, and register the first image in the storage as the at least one reference face image in response to the similarity score being greater than the first threshold value and less than a second threshold value,
wherein the at least one reference face image includes a plurality of reference face images, and
wherein the controller is configured to:
determine a plurality of similarity scores based on comparison of the first image with each of the plurality of reference face images,
in response to at least one similarity score among the plurality of similarity scores being greater than the first threshold value or an average value of the plurality of similarity scores being greater than the first threshold value, determine that the face authentication is successful,
in response to the at least one similarity score being greater than the first threshold value and all of the plurality of similarity scores being less than the second threshold value, register the first image as the at least one reference face image,
determine at least one of an acquisition condition of the first image or an appearance condition of a user included in the first image based on the first image,
determine weights for each of the plurality of similarity scores based on the at least one of the acquisition condition of the first image or the appearance condition of the user, and
determine the average value of the plurality of similarity scores by reflecting the weights for each of the plurality of similarity scores.

2. The face authentication system of claim 1, further comprising a display, wherein the controller is configured to:
  determine that face authentication fails in response to the similarity score being less than the first threshold value, and
  based on a user authentication being success by another authentication device while the similarity score is less than the first threshold value and greater than a third threshold value, control the display to output a visual indication for inquiring a presence of an intention to register the first image as the at least one reference face image.

3. The face authentication system of claim 2, wherein the controller is configured to, based on receiving a user input representing the intention to register the first image as the at least one reference face image while the similarity score is less than the first threshold value and greater than the third threshold value, register the first image as the at least one reference face image.

4. The face authentication system of claim 1, wherein the controller is configured to:
  receive information about an exposure value for acquiring the first image from the camera, and
  determine whether the first image is acquired outdoors or indoors based on the information about the exposure value.

5. The face authentication system of claim 1, wherein the controller is configured to, upon determining that the first image is acquired outdoors, register the first image in a first storage space of the storage, and upon determining that the first image is acquired indoors, register the first image in a second storage space of the storage.

6. The face authentication system of claim 5, wherein the controller is configured to:
  in response to the first storage space being full, delete a first reference face image from among a plurality of first reference face images stored in the first storage space to register the first image in the first storage space, and in response to the second storage space being full, delete a second reference face image from among a plurality of second reference face images stored in the second storage space to register the first image in the second storage space.

7. The face authentication system of claim 6, wherein the controller is configured to:
  determine a first reference face image targeted for deletion from among the plurality of first reference face images based on at least one of a storage time of a respective one of the plurality of first reference face images or a cumulative average value of a similarity score calculated using a respective one of the plurality of first reference face images, and
  determine a second reference face image targeted for deletion from among the plurality of second reference face images based on at least one of a storage time of a respective one of the plurality of second reference face images or a cumulative average value of a similarity score calculated using a respective one of the plurality of second reference face images.

8. The face authentication system of claim 7, wherein the controller is configured to:
  determine a first reference face image stored having the storage time that is earliest in time, having a cumulative average value of the similarity score that is a lowest, or having a sum of a first value corresponding to the storage time and a second value corresponding to the cumulative average value of the similarity score that is the smallest among the plurality of first reference face images, as the first reference face image targeted for deletion, and
  determine a second reference face image stored having the storage time that is earliest in time, having a cumulative average value of the similarity score that is a lowest, or having a sum of a first value corresponding to the storage time and a second value corresponding to the cumulative average value of the similarity score that is the smallest among the plurality of second reference face images, as the second reference face image targeted for deletion.

9. The face authentication system of claim 5, wherein a maximum number of images to be stored in the first storage space is different from a maximum number of images to be stored in the second storage space.

10. The face authentication system of claim 1, wherein the controller is configured to register the first image as the at least one reference face image in the storage only when eyes, a nose, and a mouth are detected from a face in the first image.

11. A face authentication method comprising:
  acquiring a first image including a plurality of facial feature points for performing a face authentication process;
  comparing the first image with at least one reference face image based on the face authentication process being started;
  determining a similarity score based on the plurality of facial feature points in the first image being compared with the at least one reference face image;
  determining that face authentication is successful in response to the similarity score being greater than a first threshold value; and
  registering the first image as the at least one reference face image in response to the similarity score being greater than the first threshold value and less than a second threshold value,
  wherein the at least one reference face image includes a plurality of reference face images,
  wherein determining the similarity score includes determining a plurality of similarity scores based on comparison of the first image with each of the plurality of reference face images, and determining an average value of the plurality of similarity scores,
  wherein the face authentication is determined to be successful in response to at least one similarity score among the plurality of similarity scores being greater than the first threshold value or the determined average value of the plurality of similarity scores being greater than the first threshold value,
  wherein registering the first image as the least one reference face image includes, in response to the at least one similarity score being greater than the first threshold value and all of the plurality of similarity scores being less than the second threshold value, registering the first image as the at least one reference face image, and
  wherein determining the average value of the plurality of similarity scores includes:
    determining at least one of an acquisition condition of the first image or an appearance condition of a user included in the first image based on the first image,
    determining weights for each of the plurality of similarity scores based on the at least one of the acquisition condition of the first image or the appearance condition of the user, and determining the average value of the plurality of similarity scores by reflecting the weights for each of the plurality of similarity scores.

12. The face authentication method of claim 11, further comprising:
    determining that face authentication fails in response to the similarity score being less than the first threshold value; and
    based on a user authentication being success by another authentication device while the similarity score is less than the first threshold value and greater than a third threshold value, outputting a visual indication for inquiring a presence of an intention to register the first image as the at least one reference face image.

13. The face authentication method of claim 12, further comprising,
    based on receiving a user input representing the intention to register the first image as the at least one reference face image while the similarity score is less than the first threshold value and greater than the third threshold value, registering the first image as the at least one reference face image.

14. The face authentication method of claim 11, wherein registering the first image as the least one reference face image includes:
    upon determining that the first image is acquired outdoors, registering the first image in a first storage space; and
    upon determining that the first image is acquired indoors, registering the first image in a second storage space.

15. A vehicle comprising:
    a camera configured to acquire a first image including a plurality of facial feature points for performing a face authentication process;
    a storage configured to store and having stored thereon at least one reference face image; and
    a controller configured to compare the first image with the at least one reference face image based on the face authentication process being started, determine a similarity score based on the plurality of facial feature points in the first image being compared with the at least one reference face image, determine that face authentication is successful in response to the similarity score being greater than a first threshold value, and register the first image in the storage as the at least one reference face image in response to the similarity score being greater than the first threshold value and less than a second threshold value,
    wherein the at least one reference face image includes a plurality of reference face images, and
    wherein the controller is configured to:
        determine a plurality of similarity scores based on comparison of the first image with each of the plurality of reference face images,
        in response to at least one similarity score among the plurality of similarity scores being greater than the first threshold value or an average value of the plurality of similarity scores being greater than the first threshold value, determine that the face authentication is successful,
        in response to the at least one similarity score being greater than the first threshold value and all of the plurality of similarity scores being less than the second threshold value, register the first image as the at least one reference face image,
        determine at least one of an acquisition condition of the first image or an appearance condition of a user included in the first image based on the first image,
        determine weights for each of the plurality of similarity scores based on the at least one of the acquisition condition of the first image or the appearance condition of the user, and
        determine the average value of the plurality of similarity scores by reflecting the weights for each of the plurality of similarity scores.

* * * * *